Sept. 28, 1965 R. W. LA SOTA ETAL 3,209,207
POTENTIAL INDICATOR AND SURGE FILTER
APPARATUS FOR USE THEREIN
Filed April 3, 1963
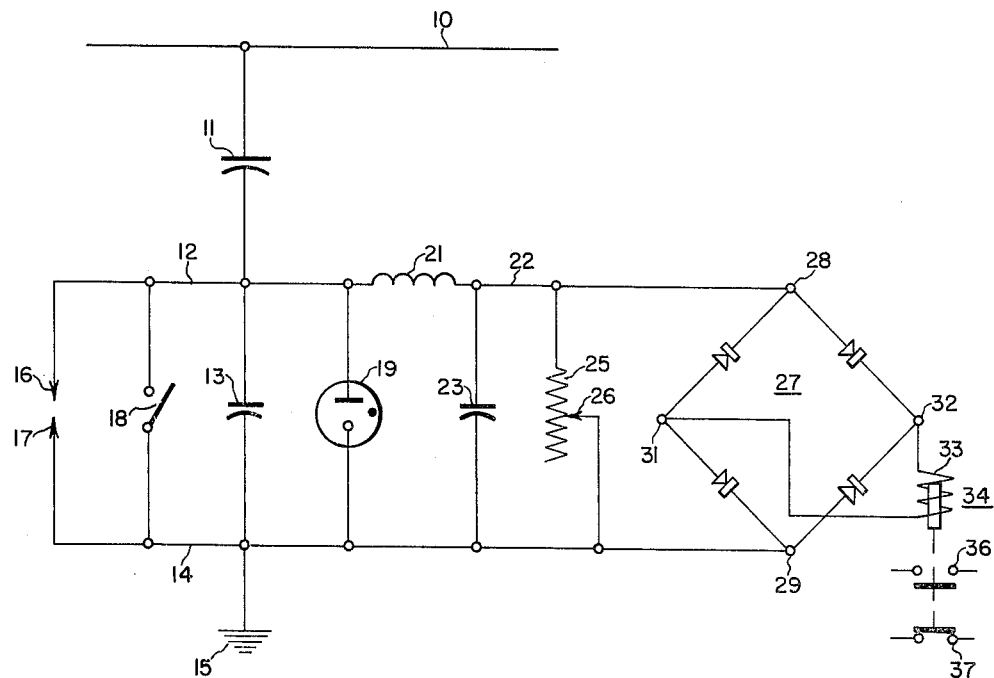
WITNESSES
Theodore F. Wrobel
James F. Young
INVENTORS
George A. Rusnak, John W. Doane
and Raymond W. La Sota
BY Maury I. Hull
ATTORNEY

United States Patent Office 3,209,207
Patented Sept. 28, 1965

3,209,207
POTENTIAL INDICATOR AND SURGE FILTER APPARATUS FOR USE THEREIN
Raymond W. LaSota, Ellettsville, George A. Rusnak, Perry Township, Monroe County, and John W. Doane, Beech Creek Township, Greene County, Ind., assignors to Westinghouse Electric Corporation, Pittsburgh, Pa., a corporation of Pennsylvania
Filed Apr. 3, 1963, Ser. No. 270,333
5 Claims. (Cl. 317—50)

This invention relates to improvements in potential indicator utilizing a tap capacitor in series with a coupling capacitor stack and having frequency sensitive means for eliminating the effects of voltage surges and aperiodic high frequency components upon potential responsive relay means.

In many applications for monitoring a high voltage transmission line, a potential indicating device, which may include a potential transformer or a coupling capacitor potential source, is adequate. These applications may include potential indication in an unattended substation, automatic throwover initiation, potential indication during maintenance periods, and as an activating source for a recording oscillograph. Such voltage controlled functions do not require the line to provide a source of power which is not utilized.

It is old in the art to employ a sensitive relay coupled to a transmission line by use of a capacitor to obtain a potential without substantial power, which potential is utilized to operate the relay to give an indication when a certain percentage of the normal line voltage is applied, for example 40%, and which will also provide for an indication of loss of voltage when the line voltage decreases to a predetermined percentage of its normal value, for example 10%. This relay is normally connected in parallel with a grounding switch, also in parallel with a point spark gap for protective purposes, and may be further connected in parallel with a voltage breakdown tube having a predetermined rating to further protect the relay from very high voltage surges such for example as the high peak voltages caused by switching surges.

Generally speaking, such a prior art relay circuit can provide for energization of a relay when, for example, approximately 40% of the line voltage is applied, and for dropping out the relay to indicate loss of voltage when the line voltage decreases to approximately 10% of its normal value. However, it is desirable in some applications to have a device which will pick up and dropout at given line voltages with an accuracy of less than 10%, and which will have a drop-out to pick-up ratio of 67% or higher. The high drop-out to pick-up ratio and accuracy can be obtained only by using a direct current source.

It has been proposed to add a rectifier circuit between the relay coil winding and the coupling capacitor circuit, but past experience has shown that when this is done very high peak inverse voltages caused by switching surges are encountered, and it is uneconomical to supply rectifiers which can withstand these high peak inverse voltages.

My invention overcomes these and other disadvantages of the prior art. In summary, my apparatus includes but is not limited to a tap capacitor in series with a coupling capacitor stack, connected between a high voltage line and ground. The voltage across the tap capacitor is herein called the tap voltage. In parallel with the tap capacitor is an inductance in series with a second capacitor. A tube spark gap is connected across the tap capacitor also to further protect the circuit from lightning and very high voltage surges. Across the second capacitor is connected to a full wave rectifier which supplies an output to the coil of a direct current relay. The tap capacitor and capacitor stack serve as a voltage divider. On voltage components of all frequencies including high voltage switching surges the voltage will divide proportionally across the stack and tap capacitors. In the parallel circuit of the series-connected inductance and capacitance of my invention connected across the tap capacitor, the voltage further divides as a function of frequency. At the power frequency the majority of the tap voltage will be developed across the capacitor, which capacitor voltage is also across the rectifier. At frequencies above 60 cycles, such for example as transients and frequencies caused by switching surges, the greater amount of voltage will develop across the inductance, thereby limiting the value of high surge voltages on the rectifier.

Accordingly, a primary object of my invention is to provide new and improved potential indication apparatus.

A further object is to provide new and improved potential indication apparatus for a high voltage alternating current line including means for filtering out surge voltages and other aperiodic high frequency components and eliminating their effects.

A further object is to provide a new and improved surge filter for potential indicator apparatus.

These and other objects will become more clearly apparent after a study of the following specification, when read in connection with the accompanying drawing, in which the single figure thereof is a schematic electrical circuit diagram of apparatus embodying my invention.

Referring now to the drawing for a more detailed understanding of the invention, there is shown at 10 a high voltage alternating current transmission line connected to one terminal of coupling capacitor means 11, capacitor means 11 having the lower terminal thereof connected by lead 12 to one terminal of a tap capacitor 13 having the other terminal thereof connected by lead 14 to ground 15. It will be understood that whereas the capacitor 11 is shown as a single capacitor for convenience of illustration, that it may well be and usually is a stack of series-connected capacitors to provide increased voltage breakdown for the high voltage line 10.

Across leads 12 and 14 are connected the points 16 and 17 of a gap provided for protective purposes, and also across leads 12 and 14 is connected the single-pole, single-throw shorting switch 18. Across the leads 12 and 14 and across the tap capacitor 13 is also connected a tube gaseous gap which may be a tube known in the trade as type KX–642. Across the aforementioned leads 12 and 14 are also connected the series-connected inductor 21, lead 22 and capacitor 23. The inductor 21 and capacitor 23 constitute a frequency selected and frequency sensitive voltage dividing network or low pass filter. For the line frequency of for example 60 cycles per second, the inductance 21 offers very little reactance and the majority of the voltage is developed across the capacitor 23 which has a high reactance value at the power frequency; on the other hand, for high frequency surges, such for example as switching surges, the inductance 21 has a high reactance value and the major portion of the voltage drop occurs across the inductor 21 with a relatively small portion of the voltage developed between leads 22 and 14. The rheostat 25 having arm 26, the setting of which is adjustable, is provided for regulating the voltage across a full wave rectifier generally designated 27 having input terminals 28 and 29 connected to leads 22 and 14 respectively, and having output terminals 31 and 32 connected to the coil 33 of a relay generally designated 34. The relay 34 is seen to have pairs of contacts 36 and 37 for controlling utilization circuits which provide indications of the existence of a line voltage on conductor 10 of at least a predetermined percentage of normal magnitude, and also provide indications of when the relay drops out upon a failure of line voltage.

In the operation of the apparatus of the figure, assume by way of example that a normal 60 cycle substantially sine wave is applied to the conductor 10. This voltage divides across the capacitors 11 and 13 in amounts inversely proportional to their capacitance values, and the alternating current voltage developed across tap capacitor 13 further divides across the frequency sensitive voltage dividing network including inductor 21 and capacitor 23 in amounts which are functions of the frequency. The portion of the tap voltage developed across capacitor 23, which portion decreases with increases in frequency, is rectified at rectifier 27 and the direct current output across terminals 31 and 32 applied to the relay coil 33.

It has been found in practice that the relay of this circuit of my invention will pickup and dropout at a given line voltage with an accuracy of less than 10%, and will provide a drop-out to pick-up ratio of 67% or more. The circuit has been found in practice to be adequately protected from high frequency voltage surges caused by switching or other transient effects. In tests of the circuit it has been found that even with voltages just below the flashover of the coupling capacitor the maximum voltage across the rectifier 27 is less than 100 volts. Rectifiers which can withstand such a voltage can easily be obtained at reasonably prices.

There has been provided, then, apparatus well suited to accomplish the aforedescribed objects of the invention, which are to provide sensitive and accurate relay means for giving an indication of the presence of a voltage in a transmission line, and giving an indication when the voltage in the transmission line falls to a predetermined minimum value or below.

In addition to regulating the amplitude of the signal applied to the rectifier, adjusting the value of the variable resistor 25, since it constitutes part of one impedance of the LC voltage divider, may alter the filter characteristics of the low pass filter.

The variable load resistor 25 also provides a means for compensating for variations in component values within permissible tolerances.

Whereas the invention has been shown and described with respect to an exemplary embodiment thereof which gives satisfactory results, it should be understood that changes may be made and equivalents substituted without departing from the spirit and scope of the invention.

We claim as our invention:

1. Potential indicating apparatus for indicating the existence of an alternating current potential difference of normal frequency between a conductor and ground comprising, in combination, a series capacitor voltage dividing network connected between the conductor and ground, said capacitor voltage dividing network having a tap at a predetermined point therein, frequency sensitive voltage dividing means including a low pass filter connected between said tap and ground to produce a voltage output which varies in accordance with variations in the component of normal frequency in the conductor, full wave rectifier means connected to the low pass filter to receive the voltage output thereof, and relay means including a coil connected to the rectifier means to have the coil thereof energized by the output of the rectifier means, when the voltage in the conductor attains at least a first predetermined value and to have the coil thereof deenergized when the voltage in the conductor falls to a second predetermined value less than the first value.

2. Potential indicating apparatus comprising, in combination, a capacitor voltage dividing network adapted to be connected between a high voltage alternating current transmission line and ground, said voltage dividing network having a tap at a predetermined position thereon for obtaining a voltage with respect to ground which is a predetermined portion of the voltage in the line, low pass filter means for producing a voltage output which varies in accordance with variations in the component of normal frequency in the line, said filter means including a series connected inductor and capacitor connected between the tap and ground and an adjustable resistor connected across said last named capacitor, rectifier means connected across said resistor, relay means having a coil, and means connecting the coil to the rectifier means to be energized by the output thereof so as to indicate when the voltage in the line reaches a first predetermined value and when the line voltage falls to a second predetermined value.

3. Potential indicating apparatus comprising, in combination, means adapted to be coupled to an alternating current transmission line for obtaining a first voltage which varies in amplitude in accordance with variations in the voltage in the line, frequency sensitive voltage obtaining means connected to the first named voltage obtaining means for obtaining a second voltage which varies in accordance with variations in the component of normal frequency of the voltage in the line and for substantially eliminating from the obtained voltage components of a frequency higher than the normal frequency, means including rectifier means connected to the last-named voltage obtaining means for obtaining a direct current potential which varies in accordance with cariations in the second voltage, and relay means connected to the direct current obtaining means to be energized and deenergized in accordance with increases and decreases in the second voltage.

4. Potential indicating apparatus comprising, in combination, frequency sensitive voltage obtaining means adapted to be operatively connected to an alternating current line for obtaining a voltage which varies in accordance with variations in the component of normal frequency of the voltage in the line and for substantially eliminating from the obtained voltage components of a frequency higher than the normal frequency, means including rectifier means connected to the last-named voltage obtaining means for obtaining a direct current potential which varies in accordance with variations in the second voltage, and relay means operatively connected to the voltage obtaining means for utilizing the obtained voltage to provide an indication of variations in the normal frequency voltage in the line.

5. Potential indicating apparatus for a line conductor having therein an alternating current potential having a normal frequency component and having aperiodic high frequency components caused by switching and other transient effects comprising, in combination, capacitor voltage divider means connected to the line for obtaining a fractional voltage which varies in amplitude in accordance with instant variations in the potential in the line, frequency sensitive means connected to the capacitor voltage divider means, said frequency sensitive means providing a normal frequency component output which varies in accordance with variations in the normal frequency component of the line and from which said high frequency components have been substantially eliminated, rectifier means connected to the frequency sensitive means for obtaining a direct current potential which varies in amplitude in accordance with the normal frequency component in the line, and relay means connected to the rectifier means for employing the direct current output of the rectifier means to control suitable utilization circuit means.

References Cited by the Examiner

UNITED STATES PATENTS

| 1,941,377 | 12/33 | Woolworth | 317—147 |
| 2,542,638 | 2/49 | Desch | 317—147 |
| 2,590,393 | 3/52 | Few | 317—147 |
| 3,035,212 | 5/62 | Pugerad | 317—147 |

SAMUEL BERNSTEIN, *Primary Examiner.*